United States Patent [19]

Saal

[11] 4,253,087

[45] Feb. 24, 1981

[54] SELF-ASSIGNING ADDRESS SYSTEM

[75] Inventor: Harry J. Saal, Palo Alto, Calif.

[73] Assignee: Nestar Systems Incorporated, Palo Alto, Calif.

[21] Appl. No.: 18,582

[22] Filed: Mar. 8, 1979

[51] Int. Cl.³ .............................................. H04Q 9/00
[52] U.S. Cl. .............................. 340/147 R; 361/409; 361/413
[58] Field of Search ............... 340/147 R, 147 P, 150, 340/309.1, 152 R; 361/409, 413

[56] References Cited

U.S. PATENT DOCUMENTS

| 1,652,262 | 12/1927 | Torchio . | |
| 3,487,076 | 12/1969 | Abbott et al. | 317/101 |
| 3,921,168 | 11/1975 | Dunbar | 340/152 R |
| 3,949,277 | 4/1976 | Yosset | 340/147 R |
| 4,016,369 | 4/1977 | Pedersen | 340/147 R |

Primary Examiner—Donald J. Yusko

Attorney, Agent, or Firm—Limbach, Limbach & Sutton

[57] ABSTRACT

An address system for selectively addressing any one of a number of serially connected addressable units from one or more control units by means of an identical signaling device, such as an electronic circuit, positioned at each device location. The signaling device has an input connector and an output connector for connecting each signaling device to a parallel bus which connects each signaling device to the other signaling devices in series. The signaling device operates in the same manner at each addressable unit location by permuting signals appearing on the input connector, and connecting the permuted input connector signals to the corresponding output connector of the same signaling device. The output connector of the permuted signaling device is then connected via a parallel bus to the input connector of the next signaling device. The signaling device thus operates in the same manner at each addressable unit location.

4 Claims, 7 Drawing Figures

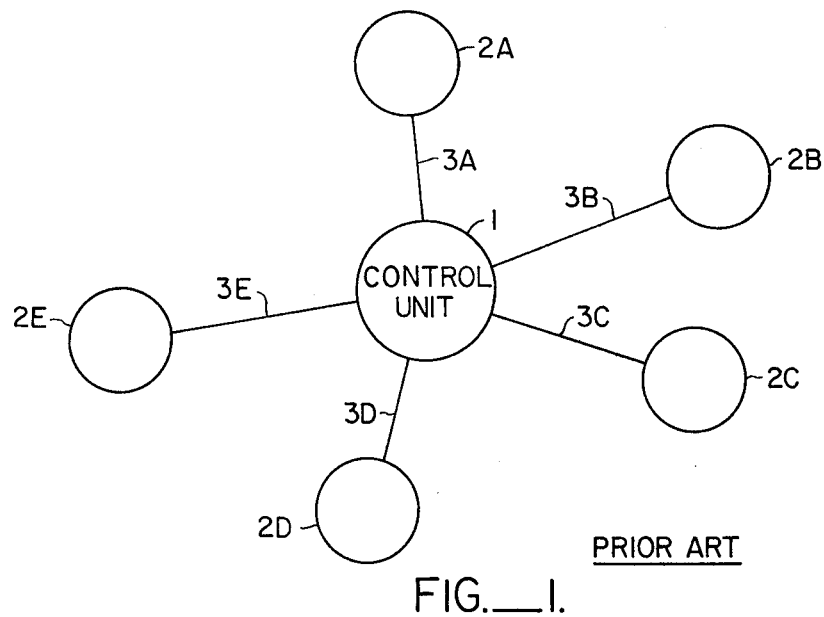
PRIOR ART
FIG.—1.
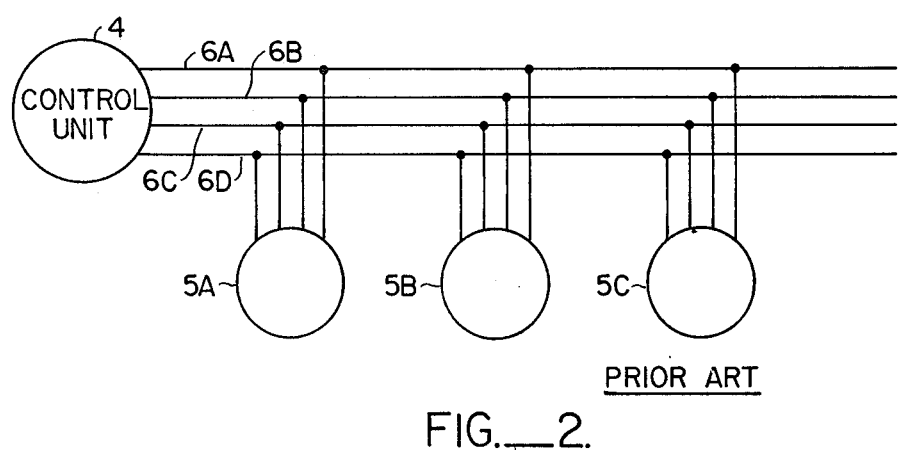
PRIOR ART
FIG.—2.
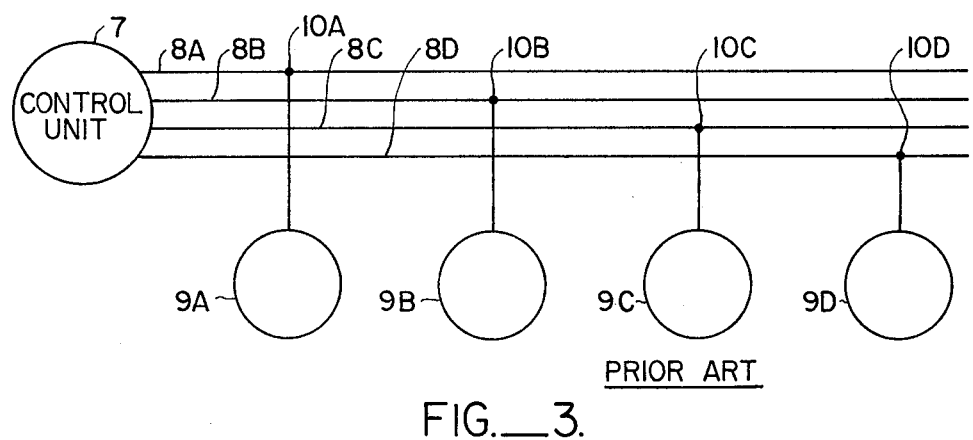
PRIOR ART
FIG.—3.

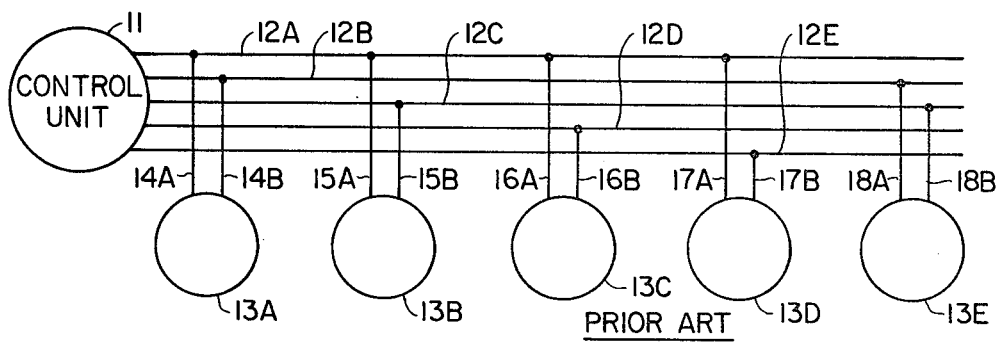
FIG._4.
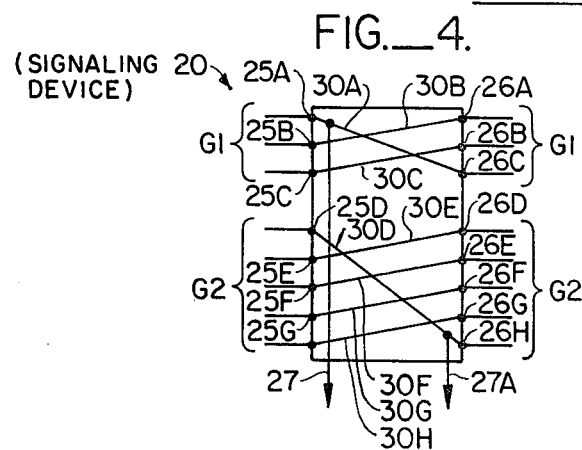
FIG._5.
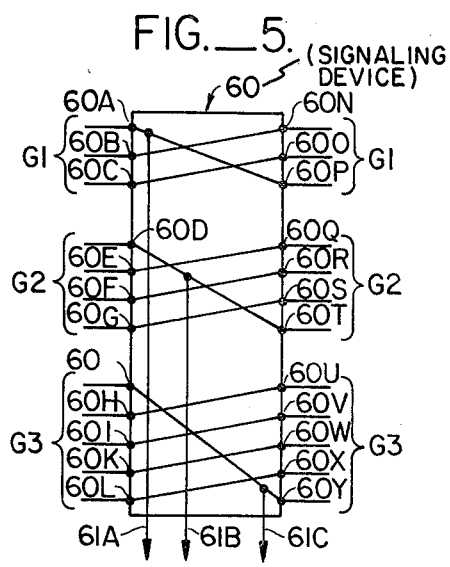
FIG._7.

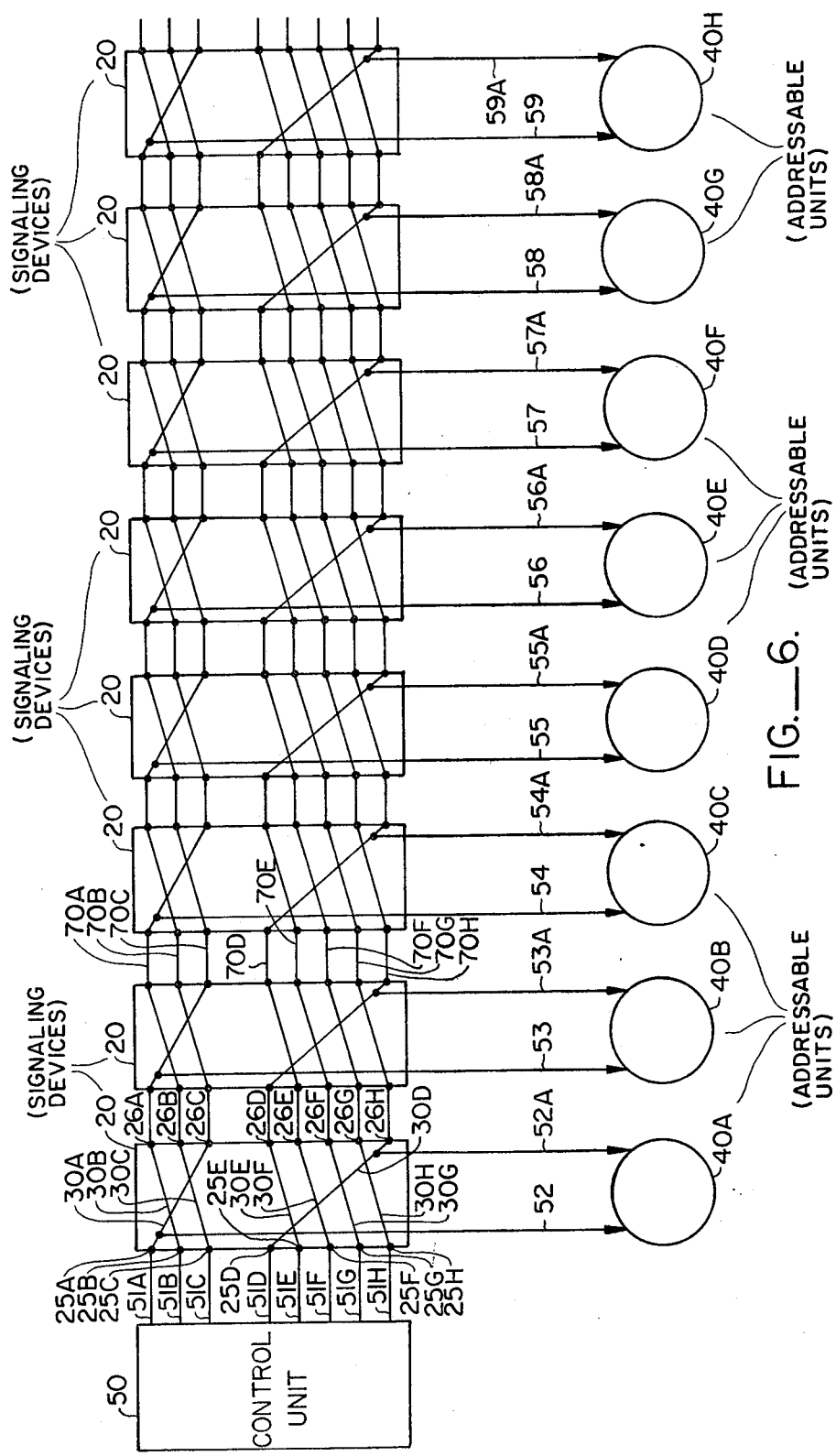
FIG.—6.

SELF-ASSIGNING ADDRESS SYSTEM

FIELD OF THE INVENTION

The invention relates to an address system for addressing a series of addressable units and more particularly the invention relates to a system wherein any one of a plurality of serially connected units may be selectively addressed from one or more control units and the unit which is selected depends only on the position of that unit in a series of other units.

DESCRIPTION OF THE PRIOR ART

In various electrical or mechanical address systems already known in the prior art, it is a common requirement to select one of a number of separate units which are connected to one control unit. The problem presented in the prior art address system is one of how to address one of many addressable units using one or more control units and with a minimum amount of hardware and/or logic. There are two main approaches to the problem of addressing a particular one of a number of units from one control unit. The first of the known prior art address systems involves a scheme which connects each unit to the control unit using separate control or data signals that are dedicated to each unit, and which do not connect to more than one of the units. This type system, schematically illustrated in FIG. 1, is typically referred to as a "star" or radially selection scheme. The name is derived from the usual layout of this arrangement as illustrated in FIG. 1. FIG. 1 illustrates a "star" address system having a control unit 1 for referencing individual units 2A through 2E by means of separate control or data schemes 3A through 3E.

As is illustrated in FIG. 1 there is a separate control or data signal for each of the separate addressable units connected to the control unit to be addressed. This star type address system is more expensive in terms of the number of signal wires or signals required for addressing the individual units since they must be routed separately to each unit. For example, if there are as many as 15 units that must be selected among, there must be a minimum of 15 signaling wires or signaling devices, either mechanical, electrical, optical, etc.—one for each addressable unit. The control unit in a star type address system indicates which unit it chooses to address by activating exactly one of the 15 wires in the case of 15 devices.

The second type of address system known in the prior art utilizes a serial connection of the units, wherein signals originate or terminate at the control unit, and pass to the first addressable unit, from there it passes to the second unit, and from the second unit the signal passes to the third unit, etc., along what is referred to as a "bus." This bus type address system, illustrated in FIG. 2, is often employed when signals can be routed easily from one unit to the next unit. As illustrated in FIG. 2 control unit 4 has signal lines 6A through 6D extending to addressable unit 5A, then to unit 5B, then to unit 5C, and it continues throughout all units to be addressed by control unit 4.

More complex prior art address schemes can incorporate a mixture of the two above-described systems in a hierarchical fashion. Mixtures of star or radial systems and bus type systems have been combined to provide for an even more complex address system. Where this is done, a bus type address system may implement a star connection by using a number of wires (15 in the example mentioned above) which are bussed between addressable units, but where each unit connects to only one of the appropriate wires.

FIG. 3 is a schematic illustration of a combined star-bus type address system with a control unit 7 addressing units 9A through 9D by means of control signals 8A through 8D. The addressable units of FIG. 3 each have a different connection point, illustrated by points 10A through 10D, where each of the units are connected to the control unit. Such a combined star-bus type address scheme is accomplished typically by a variety of schemes, either using special wiring on each unit, or by means of jumpers, cuts, diodes, switches, plugs, etc. Regardless of the means employed for connecting various addressable units to one control unit by means of a star-bus type combined address system, the individual unit connectors for each device must be different from that of the next device and must further be appropriately set to distinguish each unit from the other unit.

A further modification of the star-bus type address system illustrated in FIG. 3 is illustrated in FIG. 4 and has a control unit 11 operatively connected to each of several addressable units 13A through 13E by means of control signals 12A through 12E, where each of signals 12A through 12E is connected to more than one of the units 13A through 13E.

The system schematically illustrated in FIG. 4 is a true "bus" address scheme. With a system as illustrated in FIG. 4, upon recognition of both 14A and 14B, unit 13A is addressed by control unit 11. Similarly, upon recognition of signals 15A and 15B, unit 13B is addressed by control unit 11, and so forth for all units to be addressed. However, with an address system as that illustrated in FIG. 4, there must be some means provided for selecting which of the control signals are to be brought to each unit, thereby employing various of the means already known in the prior art and described above. This bus type system of FIG. 4 does, however, provide a more efficient use of the signaling wires, since using this "2-out-of-N" (where N is the number of control signals) addressing schemes, more units can be addressed from one control unit than with the "1-out-of-N" or "star" type scheme.

Still another addressing scheme utilized in the prior art addressing systems provides for the maximum use of the number of signals available for addressing any one of a number of addressable units. This system fully decodes all available signals and has each addressable unit observing all signals for both their presence and absence. With such a system, as many as two to the power of N units may be addressed (where N is the number of signals). This address system is known as the binary system. This binary scheme also requires different selection logic at each unit location which makes the system far more complex than the above-described prior art systems.

Other prior art addressing schemes make use of various aspects from all of the above-described prior art systems. For example, certain systems having N number of control signals utilize 3 out of the N for addressing each of the various addressable units. One thing, however, which all of the prior art address systems have in common is that they all require that the selection devices be non-identical at each addressable unit location. For instance, they either connect selectively to a subset of signals, or recognize a pattern which is special to each separate addressable unit. Such a requirement leads to certain difficulties which may include some or all of the following: (1) requirement for special processing during the manufacturing; (2) the result of non-interchangeable parts; (3) the potential for creating errors by duplicating address signals; and (4) the need for more documentation to guarantee a unique address signal for each unit to be addressed.

SUMMARY OF THE INVENTION

Based upon the above-described problems which still exist in the prior art of addressing systems, there is a need in the art for a system which can selectively address any one of a number of addressable units by means of one or more control units where the signaling or addressing device is identical in each unit which is to be addressed. An address system which requires only one standard selector located at each unit position for selectively addressing a number of units is desirable.

Accordingly, I have invented a self-assigning address system for selectively addressing any one of a number of individual addressable units connected together in series where each individual unit does not require unique connections or wirings which are different from any of the other units. I have further invented an addressing scheme which maximizes the number of individual units which can be uniquely addressed using a given number of control signals, and which further minimizes the number of component parts and power required for the addressing function. My invention accomplishes these characteristics and others through the use of a signaling device, such as an electronic circuit, which has an input connector for receiving an entering control unit signal on one of its input connections and which permutes the input connections of the device and connects these permuted input connections to the output connections of an output connector of the same device, such that the input connection carrying the signal from the control unit appears in a rotated position on an output connection. The permuted input connections are connected to the output connections of the signaling device by means of signal carrying elements. The signaling devices are connected in series by means of a parallel bus which connects the output connector of one signaling device to the input connector of the next positioned signaling device.

In some embodiments of the my invention, the input connections, output connections and the signal carrying elements of the signaling device are logically divided into two or more groups, and the input connections of each device undergo a permutation as the connections in each group are rotated (cyclic shift) by one step so that the signal carrying elements will connect the input connections of each of these logical groups to the output connections of the same device such that the entering signal appears on an output connection but in a rotated position.

The appropriate choice of the number of input and output connections and signal carrying elements in each group maximizes the number of separate units that may be selected or addressed with the system. The devices are selected by the control unit activating one and only one of the control signals in each group, which results in the simultaneous appearance of several signals at only one device, namely the unit selected.

BRIEF DESCRIPTION OF THE DRAWINGS

The above-described and other advantages and characteristic features of the subject invention will be in part apparent from the accompanying drawings, and in part pointed out in the following detailed description of the invention in which reference will be made to the accompanying drawings wherein like reference numerals designate corresponding parts, and wherein:

FIG. 1 is a schematic illustration of a prior art "star" or "radial" type address system;

FIG. 2 is a schematic illustration of a prior art "bus" type address system;

FIG. 3 is a schematic illustration of a prior art combined "star-bus" type address scheme;

FIG. 4 schematically illustrates a prior art address system where each device is addressed by means of different signal pairs;

FIG. 5 illustrates an electronic circuit which is one embodiment of the invention;

FIG. 6 schematically illustrates the electronic circuit of FIG. 5 in an embodiment of the invention wherein several devices are addressed from one control unit; and FIG. 7 illustrates an electronic circuit in another embodiment of the invention.

DETAILED DESCRIPTION OF THE PREFERRED EMBODIMENTS

FIG. 5 illustrates an electronic circuit signaling device for use in one embodiment of this invention. For convenience of explanation and illustration purposes, the circuit 20 is illustrated to have 8 different signal carrying elements or conductors 30A through 30H to connect input connections 25A through 25H to output connections 26A through 26H. The eight wires 30A through 30H are logically divided into two logical groups (for illustration purposes only) G1 with three wires and G2 with five wires. It must be noted, however, that there is no physical grouping implied by the use of the terminology "group," only a logical distinction is intended. The input connections 25A through 25C of group G1 and input connections 25D through 25H of group G2 are each rotated by one step in each group and are then connected by signal carrying wires 30A–30H to output connections 26A–26H. One wire from each G1 and G2 is connected to address lines 27 and 27A forming an address signal. The address lines 27 and 27A number two in this specific embodiment but it must be understood that the number of address lines will be equal to as many lines as there are groups of signal carrying wires or elements G1, G2, etc.

FIG. 6 illustrates the FIG. 5 circuit in operation in an address system where a number of addressable units 40A through 40H are connected one to the other with the FIG. 5 circuit 20 operating at each unit location in the same identical manner to electrically connect the devices together in series. It should be understood that FIG. 6 illustrates only the address selection portion of the interconnection bus, and does not show additional data signals.

In FIG. 6, a control unit 50 is shown to be electrically connected to the input connections of circuit 20 by means of a parallel bus having signal wires 51A through 51H. Circuit 20 is connected to the next circuit 20 by means of a parallel bus with wires 70A through 70H connecting the output connections 26A through 26H to the input connections 25A through 25H of the next positioned circuit, and so on for all circuits 20 in the system. Circuit 20 is connected at each position to units 40A–40H by means of the sets of address lines 52 and 52A, 53 and 53A, 54 and 54A, 55 and 55A, 56 and 56A, 57 and 57A, 58 and 58A, and 59 and 59A, respectively, for all of units 40A through 40H. The address lines going to all of the units are connected to the same signal carrying element(s) at each circuit 20-addressable unit 40A-40H position.

When in operation, circuit 20 receives a signal from control unit 50 via parallel bus wires 51A through 51H over one of the input connections 25A-25H of circuit 20. So that when bus wire 51A is carrying the signal from control unit 50, input connection 25A receives the signal at circuit 20, and when bus wire 51B is carrying the signal, input connection 25B receives the signal, and so on for all other bus wires 51C-51H connected to control unit 50, and input connections 25C-25H, respectively.

As has been explained with respect to FIG. 5, the input connections 25A through 25H are rotated in each of the logical groups by one step and are connected to output connections 26A-26H by means of signal carrying elements 30A-30H. Therefore, when a signal is received on input connection 25A of circuit 20, the signal is connected to output connection 26C, with input connection 26B being connected to output connection 26A and with input connection 25C being connected with output connection 26B of group G1. Likewise, when a signal is received over input connection 25D of group G2 of circuit 20, that signal is connected to output connection 26H, with input connection 25E being connected to output connection 26D; with input connection 25F being connected to output connection 26E; with input connection 25G being connected to output connection 26F; and with input connection 25H being connected to output connection 26G. This rotation of the input connections 25A-25H occurs in the same identical manner at each circuit 20 location. That is, circuit 20 is identical at each addressable unit location 40A-40H.

Address lines 52 and 52A, 53 and 53A, 54 and 54A, 55 and 55A, 56 and 56A, 57 and 57A, 58 and 58A and 59 and 59A are connected to the same signal carrying element (here elements 30A and 30D) of circuit 20 at each unit location. However, a different signal from control unit 50 appears across the different signal carrying elements at each location so that one and only one addressable unit is addressed for each set of address lines. This function of circuit 20 is more clearly explained below.

A signal appearing across parallel bus wires 51A and 51D enters input connections 25A and 25D, respectively, of circuit 20 at the position of unit 40A. As illustrated, and previously explained, input connections 25A and 25D, along with the other input connections in the logical groups, are rotated within their respective logical groups and are connected to output connections 26C and 26H, respectively. But signal carrying wire 30A which connects 25A to 26C is connected to one of the address lines for unit 40A. The same is true for signal carrying line 30D, connecting input connection 25D to output connection 26H. Therefore, unit 40A responds in an appropriate manner on receiving the conjunction (AND) of control signals 51A and 51D over signal carrying wires connected to address lines 52 and 52A. Thus, when control unit 50 emits signals over bus lines 51A and 51D, unit 40A is addressed. No other units 40B-40H will be addressed when control unit 50 emits these two signals.

Should control unit 50 emit signals over bus wires 51B and 51G, it is illustrated in FIG. 6 that the only sets of address lines connected to the signal carrying lines, connecting the input connections carrying these signals to the output connections of circuit 20, is unit 40H.

As illustrated, signals entering the first circuit 20 (at location of unit 40A) at input connections 25B and 25G which are connected via signal carrying wires 30B and 30G to output connections 26A and 26F, respectively, are not connected, via the signal carrying lines to address lines 52 and 52A for unit 40A. Therefore, unit 40A is not addressed by signals across bus lines 51B and 51G. Each circuit 20 is connected in series to the other circuit 20's by means of parallel bus lines 70A-70H which connect the output connections of one circuit 20 to the input connections of the next positioned circuit 20 or other signaling device. Therefore, signals entering the first circuit 20, in the above illustration, on input connections 25B and 25G which are connected via signal carrying elements 30B and 30G to output connections 26A and 26F, respectively, are then connected via parallel bus wires 70A and 70F to input connections 25A and 25F of the second circuit 20 at the position of unit 40B. The other output connections 26B, 26C, 26D, 26G and 26H of the first circuit 20 are likewise connected to the corresponding input connections of the second circuit 20.

However, it is seen that at the position of the second circuit 20 the signal carrying wires 30A of the second circuit 20 are connected to one of the address lines 53 of unit 40B. But, it is also illustrated that the second signal carrying element 30F of group G2 which is now connecting input connection 25F, which is carrying the original signal 51G, to output connection 26E, is not connected to address line 53A for unit 40B. Thus, the control signals 51B and 51G will pass over the signal carrying elements or wires of each of the circuits 20 at the locations of addressable units 40C through 40G and the signals will continue to pass through the next circuit 20 at the location of addressable unit 40H where both signal carrying elements, connecting the input connections to the output connections of the circuit 20 at addressable unit 40H, will be connected to the address lines 59 and 59A, in the same manner as was set forth above.

It should once again be noted that the address lines for each addressable unit 40A through 40H is connected to the same signal carrying element at each position of circuit 20. These same signal carrying elements (here, 30A and 30D) are, however, carrying a different control signal at each position of circuit 20.

The above process described with respect to FIG. 6 continues in the same manner as set forth above such that each of the addressable units 40A through 40H, and more as the case may be, can be uniquely addressable from control unit 50, depending on which two of signals 51A-51H are emitted. It must be noted that in the above illustration where circuit 20 has eight signal carrying elements logically divided into two groups of three and five wires, respectively, as many as fifteen different units may be uniquely selected from control unit 50 where each of these units has address lines connected to a signal carrying element in each of the two logical groups. Any sixteenth unit would respond in the same manner and to the same control signals as did the first unit, and as such, the address system would require more wires or signal carrying elements as well as the same increased number of input and output connections for circuit 20, to distinguish a sixteenth unit from the other fifteen units. It therefore follows that the number of different addressable units which can uniquely be distinguished and addressed using the signaling device of the invention is the product of the number of signal carrying elements in each of the logical group elements G1, G2, etc. More precisely, the number of units addressed by the address system using this novel signaling device is the least common multiple of the number of signal carrying elements or wires in each of the logical groups of signaling wires.

In order to maximize the number of addressable units, it is preferred that all of the logical groups G1, G2, etc., be relatively prime with respect to the other groups; i.e., no groups G1, G2, etc. have any common factor. For example, as illustrated above in FIG. 6, where eight signal carrying wires were logically divided in groups of three and five, respectively, as many as fifteen units may be uniquely selected in accordance with the invention. However, were the eight signal carrying elements to be logically divided into two groups of four elements each, only four different units may be uniquely addressed by the system, instead of sixteen units, since the numbers four and four have a common divisor of four. Similarly, were the eight signal carrying elements to be logically divided into two groups of two and six elements each, the system could only uniquely address six different units instead of twelve units since the numbers two and six have a common factor of two.

FIG. 7 illustrates another embodiment of the invention where a circuit 60, constructed in accordance with the present invention, has twelve different signal carrying elements or wires and where the twelve elements are logically divided into three groups of three, four and five signal carrying elements each. As illustrated with respect to circuits 20 of FIGS. 5 and 6, the twelve signal carrying wires of circuit 60 operate to connect input connections 60A-60L of circuit 60 to output connections 60N-60Y of the same circuit. Circuit 60 does, however, operate in the same manner as does circuit 20 with respect to the rotation of the input connection in each of the three logical groups. Each unit to be addressed has three address lines 61A, 61B and 61C connected to a signal carrying element in each of the three logical groups. The three address lines are also connected to each of the units to be addressed. With a circuit as that illustrated in FIG. 7, as many as sixty different units may be uniquely selected by a control unit since the least common multiple or product of three, four and five is sixty. Alternatively, if the twelve signal carrying elements of circuit 60 are logically divided into two groups of five and seven wires, respectively, as many as thirty-five units may be addressed with each unit being connected by two address lines to a signal carrying element in each of the two logical groups of circuit 60.

While the above embodiment of the invention has been explained with respect to an electronic circuit, it will be understood that the usefulness of the invention is not restricted to such a signaling device, and as such, signaling devices utilizing mechanical linkages or forces, optical means or other methods of producing a signal, propagating the signal and detecting the signal are equally useful in practicing this invention. Also, the invention has been explained in connection with a circuit comprising a series of signal carrying elements or wires where the wires are divided into two or three groups as the case may be, it must be understood that the wires of the circuit may well comprise many groups or one group in accordance with the invention. In the case of only one group, the circuit or other signaling device will require as many signaling wires as there are units to be addressed and the address line for each unit will be connected to only one signal carrying element of the signaling device. In any event, the signaling device, whether it be an electronic circuit, mechanical linkage, optical means or otherwise, will have the same identical structure at each unit location to be addressed. It should further be understood that the invention is not restricted to cases where there is only one control unit being used. It is thus to be understood that the addressing scheme described herein may operate "in reverse," wherein a device signals to a controller using its address signal lines, and the controller or other unit determines which device is signaling. The terms "input," "output," and "group" are used for illustrative purposes only, as signals can be sent from "output" to "input" using the embodiments shown herein, for example.

It must be specifically understood that while the invention has been described in detail with particular reference to certain embodiments thereof, variations and modifications can be effected within the spirit and scope of the invention and the invention is thus only limited by the appended claims.

I claim:

1. A system for selectively addressing any one of a number of addressable units connected one to the other in series, comprising:

a control unit, electrically connected to each of said addressable units by means of an electronic circuit, having N signal carrying conductors logically divided into at least two groups of conductors forming at least a group 1 and a group 2 of conductors, respectively with N being less than the number of addressable units;

at least two address lines for each of said addressable units, the number of said address lines being equal to the number of logical groups of conductors, with each of said address lines being connected to the same one of said conductors in each of said logical groups of conductors of each one of said circuits;

said circuits each having N input connections and N output connections, with said N input and said N output connections being each logically divided into at least two groups of connections, and with said N input connections of one circuit being connected to the N output connections of the same circuit by means of said N conductors, and with said output connections of said same circuit being operatively connected to the input connections of the next serially connected circuit by means of a parallel bus, and wherein said N conductors of each of said logical groups of conductors of said circuit connects said input connections to said output connections of the same circuit via a rotation within each of said logical groups, such that a signal appearing on an input connection within a group of input connections appears in a rotated position on an output connection within the corresponding group of output connections, such that when said control unit signals said circuit with at least two signals on at least two of said input connections connected to at least two of said conductors which are connected to at least two of said address lines, one of said serially connected addressable units will be addressed.

2. An address system as set forth in claim 1 wherein the logical division of signal carrying conductors is such that the number of conductors in each of the respective logical groups of conductors of said circuit is each relatively prime with respect to the number of conductors in each of the other logical groups of conductors and wherein the maximum number of selectively addressable units for said address system is equal to the product of the numbers of elements in each of said relatively prime logical groups.

3. A system for selectively addressing any one of a number of addressable units connected one to the other in series, comprising:

a control unit, operatively connected to each of said addressable units by means of a signaling device, having N signal carrying elements logically divided into at least two groups of elements forming at least a group 1 and a group 2 of signal carrying elements, respectively, with N being less than the number of addressable units;

at least two address lines for each of said addressable units, the number of said address lines being equal to the number of logical groups of said signal carrying elements, with each one of said address lines being connected to the same one of said signal carrying elements in each of said groups of each one of said signaling devices;

said signaling devices each having an input connector with N input connections and an output connector with N output connections, with said N input and said N output connections being each logically divided into at least two groups of connections, and with said input connections of one signaling device being connected to the output connections of the same signaling device by means of said N signal carrying elements, and with said output connections of said same signaling device being operatively connected to the input connections of the next serially connected signaling device by means of a parallel bus, and wherein said N signal carrying elements of each of said logical groups of elements of said signaling device connect said input connections to said output connections of the same signaling device via a rotation within each of said groups, such that a signal appearing on an input connection within a group of input connections appears in a rotated position on an output connection within the corresponding group of output connections, such that when said control unit signals said signaling device with at least two signals on at least two of said input connections connected to at least two signal carrying elements which are connected to at least two of said address lines, one of said serially connected addressable units will be addressed.

4. An address system as set forth in claim 3 wherein the logical division of signal carrying elements is such that the number of elements in the respective logical groups of elements of said signal carrying elements are each relatively prime with respect to the number of elements in each of the other logical groups of signal carrying elements wherein the maximum number of selectively addressable units for said address system is equal to the product of the number of elements in each of said relatively prime logical groups.

* * * * *